US006893594B2

(12) United States Patent
Chen

(10) Patent No.: US 6,893,594 B2
(45) Date of Patent: May 17, 2005

(54) EXTRUDED WINDOW AND DOOR COMPOSITE FRAMES

(76) Inventor: Kuei Yung Wang Chen, 201 Tung Hwa Rd., Taipei (TW)

( * ) Notice: Subject to any disclaimer, the term of this patent is extended or adjusted under 35 U.S.C. 154(b) by 6 days.

(21) Appl. No.: 10/600,015

(22) Filed: Jun. 20, 2003

(65) Prior Publication Data

US 2004/0255527 A1 Dec. 23, 2004

(51) Int. Cl.[7] .............................. E04C 2/26; E06B 1/30
(52) U.S. Cl. .............................. 264/211.23; 52/309.7; 52/730.3; 52/730.4; 52/731.2; 52/731.4; 52/309.1; 264/177.1; 264/211.1; 264/173.12; 521/79; 428/338; 428/339; 524/13; 524/16
(58) Field of Search ................ 52/309.1–309.11, 52/309.13–309.16, 730.3, 730.4, 731.2, 731.4, 204.1, 210–212, 215–216, 204.5, 204.53, 204.62, 204.71, 204.69; 524/13, 16; 264/54, 51, 68, 101, 115, 120, 141, 321, 148–150, 173.12, 173.17, 177.1, 211, 211.1, 211.2; 521/79, 84.1, 145–146; 525/54.3, 54.5, 64; 428/338–339, 36.9, 36.7, 34, 35.6

(56) References Cited

U.S. PATENT DOCUMENTS

| | | | | |
|---|---|---|---|---|
| 5,406,768 A | * | 4/1995 | Giuseppe et al. .......... 52/730.4 |
| 5,486,553 A | * | 1/1996 | Deaner et al. ................. 524/13 |
| 5,497,594 A | * | 3/1996 | Giuseppe et al. .......... 52/730.4 |
| 5,539,027 A | * | 7/1996 | Deaner et al. ................. 524/13 |
| 5,951,927 A | * | 9/1999 | Cope ............................ 264/54 |
| 6,066,680 A | * | 5/2000 | Cope ............................ 521/79 |
| 6,265,037 B1 | * | 7/2001 | Godavarti et al. ............ 428/34 |
| 6,280,667 B1 | * | 8/2001 | Koenig et al. ................ 264/68 |
| 6,380,272 B1 | * | 4/2002 | Chen ............................ 521/79 |
| 6,581,819 B1 | * | 6/2003 | Aota et al. ............... 228/112.1 |
| 6,680,090 B2 | * | 1/2004 | Godavarti et al. ............ 428/34 |
| 6,682,789 B2 | * | 1/2004 | Godavarti et al. ............ 428/34 |

* cited by examiner

Primary Examiner—Jeanette E. Chapman
(74) Attorney, Agent, or Firm—Joseph L. Strabala, Esq.

(57) ABSTRACT

Novel window and patio door frame members are formed by an extrusion process that provide these members with at least one channel and with an outer weather resistant surface and an internal imitation wood surface together with integrated sealing strips formed in the channels for the doors, these components being fully integrated. The process is carried out by extruding a foamed profile with a channel through a first die therein having reduced dimensions where a protective shell is desired, co-extruding a plastic with said foamed profile in a second die to form a protective shell where the reduced dimensions occur, passing the co-extrusion though a calibration die, and then heating the co-extrusion at selected location where weather stripping is desired and then passing the co-extrusion through a final die where plastic weather stripping is extruded therewith and then cooling the integrated member.

1 Claim, 4 Drawing Sheets

EXTRUDED WINDOW AND DOOR COMPOSITE FRAMES

BACKGROUND

It is known that wooden frames can be equipped [encased in part] with weather resistant surfaces by running the wooden components through a special extruder which places a weather resistant rigid polyvinylchloride shell on selected surfaces of the wood. An example of the latter is Andersen 400 series patio door which has an outer polyvinylchloride skin which is bonded to the exterior faces of the wooden components in an extruder of a special design which allows a wooden component to pass through the extruder when the skin or shell is applied to selected surfaces of the wooden component. With this described process, sometimes the shell or skin does not adhere well to the wood or delaminates later. Moreover considerable milling of the wooden components in such frames is required, increasing the overall costs. Also problems result from insect or rot infestation of the wood and/or warpage when the frame is in place in use since the vinyl shell or skin does not increase stability of the wood component or provide complete encasement.

In contrast the novel patio door frame of this invention is made of frame members which are a fully extruded members, employing multiple extruders. As a result of the novel extrusion process each frame member has a constant cross section, like pipe, rod, tube, etc. but with several integral components, including a rigid plastic shell for the exterior or weather faces of the frame member, a core element of polyvinylchloride/wood flour foam with channels formed therein for door components and integral flexible plastic sealing strips incorporated in the channels. Three or more extruders are employed in fabricating the novel frame member and coordinated to achieve a single extruded product.

SUMMARY OF THE INVENTION

An extruded frame member for windows and doors having surfaces exposed to weather elements includes an integrated three element extrusion of a constant cross section having a core element with at least one channel formed therein, soft sealing strips integrated within said channel and a protective plastic shell formed on selected exterior surfaces of said core element extruded as an integral unit. On the surfaces of the core element not protected by the plastic shell wood patterns can be embossed for aesthetic reasons and core element is formed of materials which can be painted or stained so that frame member can be co-ordinated with the decor of a room where the frame is installed.

Also with in the purview of this invention in the method of manufacturing the profile. It includes the steps of extruding a foamed selected profile of polyvinylchloride and wood flour with at least one channel therein and reduced dimension where a protective shell is desired, co-extruding a plastic shell of polyvinylchloride on the profile where the reduced dimension are provided in profile to form a protective shell, passing the co-extrusion through a calibration die, heating the co-extrusion from the calibration die at selected locations where weather stripping is desired, passing said co extrusion through a final extrusion die where weather stripping elements are extruded at the heated location and cooling the extrusion from the final extrusion die.

DESCRIPTION OF AN EMBODIMENT OF THE INVENTION

Figure 1:
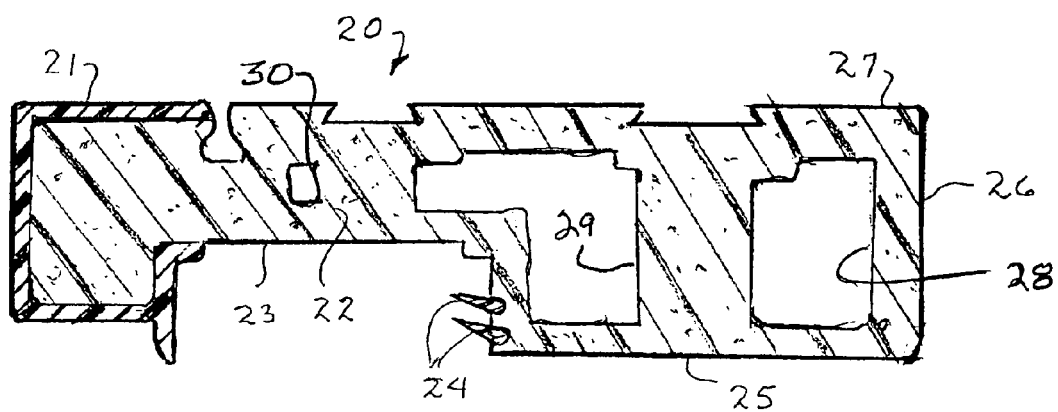
FIG. 1 is a cross section of a novel vertical frame member according to this invention for one side of a sliding glass door frame.

Different cross-sectional profiles, as illustrated in FIGS. 1 through 4, are used for the vertical parts of the frames and the top and bottom parts of the door frame which is easily done by changing dies in the extruders. Moreover, these profiles can changed to accommodate swinging double patio doors or sliding patio doors, as elected, without departing from the concept of the invention.

Frame members constructed according to this invention have a plastic shell on their exterior or weather surfaces of any color selected before the members are extruded, such as white, sandstone, dark brown or any other color obtainable with pigments compatible with polyvinylchloride. In addition the core element can include wood graining on its exposed surfaces and has channels for the door components formed therein without milling the core component. Also these channels include integrated plastic sealing strips for a door, when extruded.

The core element is formed a wood flour laced polyvinylchloride foam extrusion, such as described the composition described in U.S. Pat. No. 6,380,272 issued to Chen. The plastic shell is weather resistant polyvinylchloride and the plastic sealing strips are a soft polyvinylchloride. Also the core element, being an extruded part, can take advantage of hollow core-designs which lessen its weight without sacrificing strength and can include wood graining on the exposed surfaces which are not covered with the shell. Moreover the exposed surfaces of the core element can be painted or stained to coordinate with the interior of a room where a patio door frame is installed. Colors such as country white, Spanish oak, dark mahogany, or any other suitable color can be used to provide an initial color to the core element.

By incorporating integral plastic sealing strips in the channels of the core element, considerable labor savings are had and the uniform extruded members avoid waste due to wood imperfections that occur when wood components are used. Further the extruded frame members of uniform cross section are not subject to insect infestation, rot, warpage nor peeling of the shell from the extruded foam core element.

Using the co-extrusion process of this invention, it is possible to achieve a uniform shell on the exterior or weather surfaces of the frame members plus the channels therein for the door components and also plastic surfaces where wear is likely to occur.

The core element is formed of a powdered PVC, wood flour, thermal stabilizers, inorganic foaming aids, organic foaming agents, inorganic foaming agents, processing aids, modifiers, lubricants, fillers and pigments. Typically these components, in powdered form, are fed to the thermal mixer in the desired quantities by the metering devices as described in U.S. Pat. NO. 6,380,272. Thereafter the mixture is extruded.

Suitable polyvinylchloride [PVC] powders are those sold by Formosa Plastics Corporation as S-60 and S-65. As to the wood flour it can be derived from hardwood wastes, will preferably have a fiber length below 0.6 mm and a fiber diameter is between 0.04 to 0.6 mm along with an aspect ratio between 2 to 6. Such wood flour is sold by JRS as CB-120 as well as other entities. Thermal stabilizers are selected from organic and/or inorganic thermal stabilizer in powder form which are used to prevent the thermal degradation of PVC resin, typically organic tin carboxylate, organic tin mercaptide and barium/zinc stabilizer are preferred. Inorganic foaming aids are selected from magnesium oxide and zinc oxide which are employed to increase the volume of gas from the organic and inorganic foaming agents. For organic foaming agents selections can be made from azodicarbonamide, benzene-sulfohydrazide and diphenylene oxide-4, 4'-disulfohydrazide which act as blowing agents to provide gas for the foamed product. The inorganic foaming agent which also act as blowing agent to provide gas for the foam product, can be sodium bicarbonate. To enhance the gelatinization of the mixed powders, methyl methacrylate copolymer and high molecular weight acrylic polymers can be used as processing aids.

Modifiers are employed for the purpose of increasing the strength of the plastic component in the composite and typically are selected from ethylene-vinyl acetate, acrylate/methyl methacrylate graft polymer and chlorinated polyethylene. Likewise it is also helpful to use external lubricants such as polyethylene wax and paraffin wax which are employed to reduce friction during the extrusion process. Fatty acids, fatty alcohols and fatty acid esters are employed for the purposes of increasing the gelatinization of the powders during the extrusion step.

While not necessary fillers can be selected from calcium carbonate or precipitated calcium carbonate can be used and pigments such as titanium dioxide, iron oxide and carbon black can be employed.

Extrusion machines having a twin-screw extruder, such as the extruder model CM-65 built by Cincinnate further process the core mixture by shearing and heating it until it is gradually gelatinized as its is forced by the extruder into the adapter, then into the extrusion die and finally through the calibration die that controls the cross-sectional profile of the foamed core element of the novel frame member.

To construct the novel frame members, two additional extruders are employed. Each is connected to the extruder for the core element ahead of the calibration die. One extruder contains weather resistant polyvinylchloride and extrudes the shell which forms the outer or exterior surfaces of the novel frame members. This shell extrusion marries with extruded core element in the machine. Suitable polyvinylchloride for the shell are those conventionally used for coated window and door frames now on the market.

The third extruder is likewise connected to the extruder for the core element and provides the soft plastic weather stripping elements in the channels formed in the core element during extrusion. At the time the strips are applied the channels in the core element have been formed and strips are located in the channels where desired as the core element or the shell as desired. This is accomplished after the shell coated profile leaves the calibration die. At this time the profile and is still hot and additional heat is applied to the profile where the strips are to be place for weather stripping, either is the core element or the shell. Thereafter the profile pass through a final die where the soft polyvinylchloride is extruded in the desired locations. For the soft plastic weather stripping a soft polyvinylchloride such as EPDM purchased from Kupoaoch Chemical Limited can be employed.

After the shell is married to the core element the extrusion passes though the calibration die controlling it final dimensions. As indicated above this profile is heated where the soft polyvinylchloride weather stripping is to located and passes through the final die. After the three element co-extrusion leaves the final calibration die it is cooled by passing the extrusion through a cooling tank. Before cooling occurs a wood grain surface can be applied to the desired surfaces of the core element in the three-element co-extrusion by rollers having a reverse grain pattern on theirs surfaces.

Figure 4:
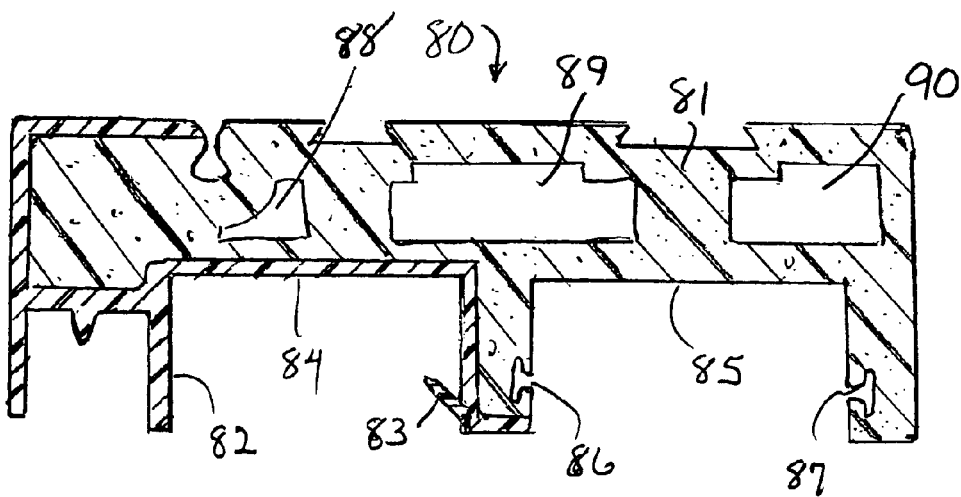
FIG. 4 is is a cross section of a novel top frame member for a sliding glass door frame.

Once the three element extrusion cools the continuous extrusion can be cut into appropriate lengths for forming a frame for a sliding or swinging patio door frame, such as illustrated in FIG. 4.

Figure 2:
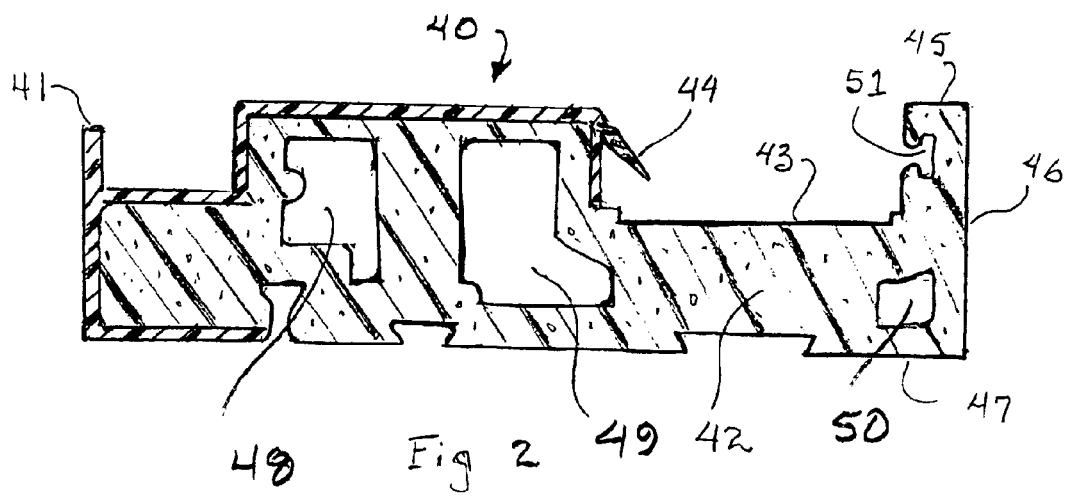
FIG. 2 is a cross section of a novel vertical frame member according to this invention for the side of a sliding glass door frame opposite frame member shown in FIG. 1.

FIGS. 1 and 2 illustrate several profiles employed in frame members for constructing a frame for a sliding glass patio door. The cross section in FIG. 1 is that of vertical frame member 20 for the fixed portion of the sliding glass door. In this cross section, the polyvinylchloride protective shell 21 is deployed on the surfaces of the frame member that will be exposed to the weather when a door frame with this frame member is installed in a building or home. The polyvinylchloride/wood flour core element 22, which is co-extruded with the protective shell, has a channel 23 for the frame of the fixed door of a sliding glass door. As the core element is extruded with the protective shell a third co-extrusion is carried our which places a soft polyvinylchloride sealing strip 24 in the channel so that when the fixed door of the sliding glass door is installed these strips will form a weather seal against the face of this fixed door.

The polyvinylchloride/wood flour extrusion forming the core element readily accepts paint and stains. Thus the exposed surfaces 25, 26 and 27 of the core element can be painted to coordinate with the color scheme of the interior room which the sliding glass door services. In the past frames using polyvinylchloride on all the surfaces of the frame were limited to the color used by the manufacturer. Since materials used for the core element are structurally sound, the frame member can have void coring 28, 29 and 30 to lighten the member and effect a cost savings in materials.

In FIG. 2 a cross section of the vertical frame member 40 is illustrated, which is used on the opposite side of the door relative to frame member 20. It is constructed with a protective shell 41 on exterior surfaces of its core element 42 of polyvinylchloride/wood flour. The core element has a door channel 43 formed therein during the co-extrusion process described and a soft plastic sealing strip 44 in integrated in this channel. This sealing strip is of softer vinyl than that used for the protective shell and is co-extruded with the protective shell. Like the other frame member 20, the surfaces of the core element making up the three component co-extrusion, readily accepts paints and/or stains allowing its interior surfaces 45, 46 and 47 to be painted or stained to coordinate with the room decor which the sliding glass door services.

Since the core element has adequate strength for making a door frame, it has coring voids 48, 49 and 50 to reduce the weight and make the frame member more economical to produce.

A further advantage is achieved with the fully extruded three component door frame members, and that is providing weather striping grooves 51 which are formed during the extrusion processes eliminating the necessity of milling the several frame members, with the accompanying cost savings.

Viewing FIGS. 1 and 2 it can be readily appreciated that differing profiles can be made by changing the dies in the three coordinated extruding machines, according this invention. Moreover the composition of the core element in the several frame members is such that it can be worked with standard wood working tools, such as saws and drills and also be nailed to the supporting building structures when a frame constructed of these member is installed in a building.

Figure 3:
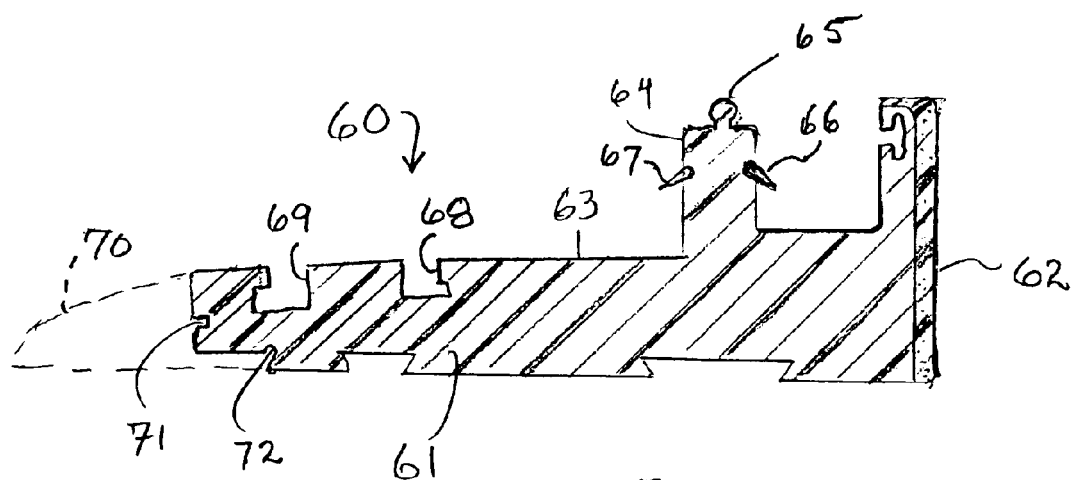
FIG. 3 is a cross section of a novel bottom frame member for a sliding glass door frame.

The bottom profile of the frame can be seen in the cross section illustrated in FIG. 3, and it can be this bottom frame member 60 is composed mostly of the same weather resistant polyvinylchloride 61 that is used for the shell on the other frame members. It has a small core element 62 which is extruded with the polyvinylchloride that allows the inside surfaces of the bottom frame member to be stained or painted as previously described. The top 63 of this frame member includes a door post 64 with a knob 65 at its top which accepts a metal cap (not shown) on which the rollers for the sliding glass door ride. The bottom of the glass door is grooved so that the post will be received in the groove. If desired the post can include sealing strips 66 and 67 which are formed of a soft polyvinylchloride and extruded simultaneously with the parts of the frame member. When used these sealing strips prevent air drafts from passing under the sliding glass door. Also on the top of the bottom frame member grooves 68 and 69 are formed for receiving finishing strips (not shown) that merely snap into these grooves. A the end of this frame member a toe piece 70, shown in phantom, can be secured in the grooves 71 and 72 provided for this purpose. Typically the toe piece is an aluminum extrusion.

FIG. 4 shows the cross section of the top frame member 80. Like the vertical frame members, it includes a core element 81 formed of polyvinylchloride and wood flour, a weather resistant plastic shell 82 on the portions of the core element that will be exposed to weather conditions along with an integrated weather seal strip 83 which is formed of a soft polyvinylchloride. As previously described the individually identified components are extruded together in a single extrusion. In the top frame member there are two door channels 84 and 85 formed during the extrusion process with door channel having the protective plastic shell channel. In the channel grooves 86 and 87 are provided for weather stripping (not shown) for sides of a sliding glass door that moves back and forth through this channel. These weather stripping grooves allow the weather stripping in channel 85 to be replaced if needed. Like the vertical frame members, coring voids 88, 89 and 90 are employed to reduce the cost of the materials without a loss of strength.

Figure 5:
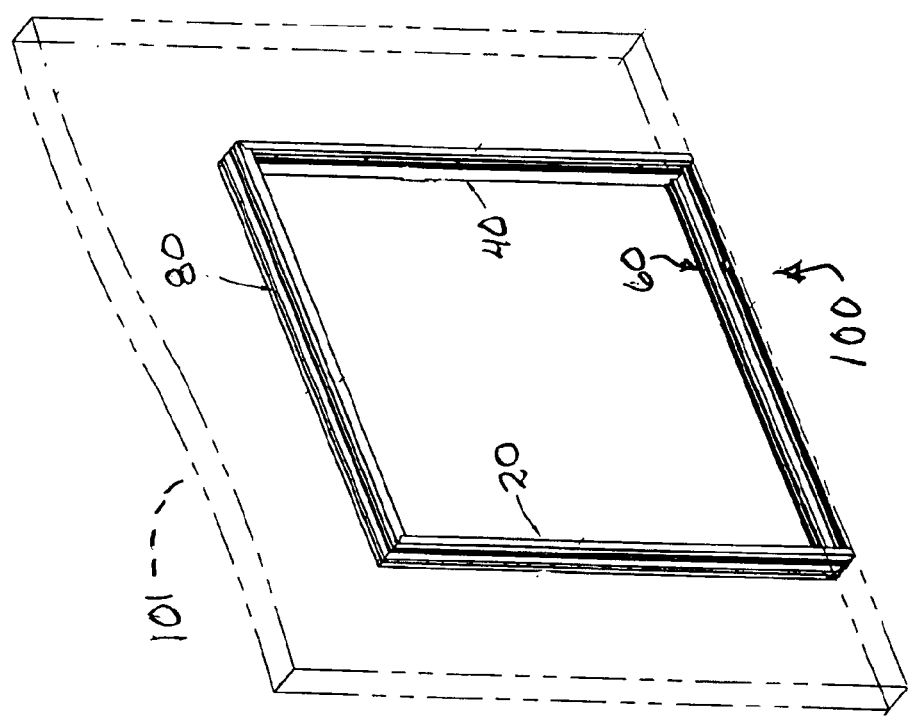
FIG. 5 is a broken apart sliding glass door frame make of the several profiles described in FIGS. 1 through 4.

Once the several frame members are extruded they are fabricated into a frame for a patio door by cutting them to length and assembling them in a rectangular frame as illustrated in FIG. 5. As can be seen in FIG. 5 the frame 100 is composed of vertical frame member 20 and vertical frame member 40 along with the bottom frame member 60 and the top frame member 80 shown in a building wall 101 illustrated in phantom. Further the frame members can employed in both right hand opening doors and left hand opening doors by merely reversing the vertical frame members, top to bottom. Like the vertical frame components the surfaces 91, 92 and 93 which are exposed inside the room when the frame is installed can be painted or stained to accommodate the room decor.

Having described my invention I claim:

1. An extrusion process for forming window and door frame members comprising the steps of:

a. extruding a foamed selected profile of polyvinylchloride and wood flour with at least one channel therein, said profile having reduced dimension where a protective shell is desired;

b. co-extruding a plastic shell of polyvinylchloride on said profile where the reduced dimension are provided to form a protective shell thereat;

c. passing said co-extrusion and plastic shell through a calibration die;

d. heating the co-extrusion from the calibration die at selected locations where weather stripping is desired;

e. passing said co- extrusion through a final extrusion die where weather stripping elements are extruded at said heated locations whereby an integrated multi-component frame member is formed; and f. cooling the extrusion from the final extrusion die.

* * * * *